C. M. WRIGHTSON.
RECORDING AND COMPUTING CARD.
APPLICATION FILED JULY 31, 1912.

1,090,587.

Patented Mar. 17, 1914.

WITNESSES:
Rob't R. Kitchel.
M. M. Hamilton

INVENTOR
Charles M. Wrightson
BY
Frank S. Busser
ATTORNEY.

UNITED STATES PATENT OFFICE.

CHARLES M. WRIGHTSON, OF MELROSE PARK, PENNSYLVANIA.

RECORDING AND COMPUTING CARD.

1,090,587. Specification of Letters Patent. Patented Mar. 17, 1914.

Application filed July 31, 1912. Serial No. 712,388.

*To all whom it may concern:*

Be it known that I, CHARLES M. WRIGHTSON, a citizen of the United States, residing at Melrose Park, county of Montgomery, and State of Pennsylvania, have invented a new and useful Improvement in Recording and Computing Cards, of which the following is a full, clear, and exact description, reference being had to the accompanying drawings, which form a part of this specification.

The object of my invention is to provide a card, adapted to be employed for recording payments made by a depositor who undertakes to deposit fixed sums at stated intervals for a determined time, and whereby, without the necessity of bookkeeping or written entries of any kind on the card or elsewhere an accurate account may be kept, both by the depositor and the bank or other depository, of the number of payments made and to be made, and particularly of the aggregate amount of payments made at any time between the first payment and the last. While the invention has found its most useful application in the above field, it is not necessarily limited to any particular use, but will be found available in any case where there are a large number of accounts, each involving numerous small payments of fixed amounts, and where it is desirable to ascertain at any given time, without the necessity for computation, the total amount paid in on any given individual account.

Figure 1:
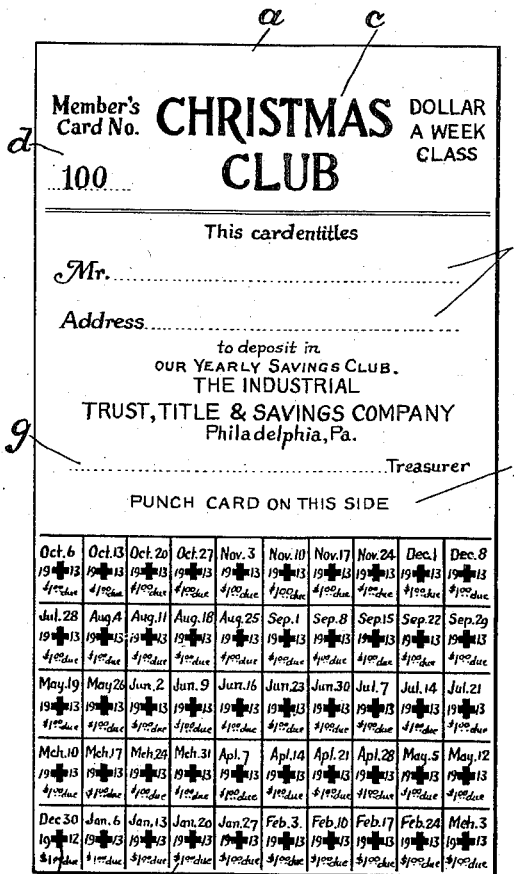
Figure 2:
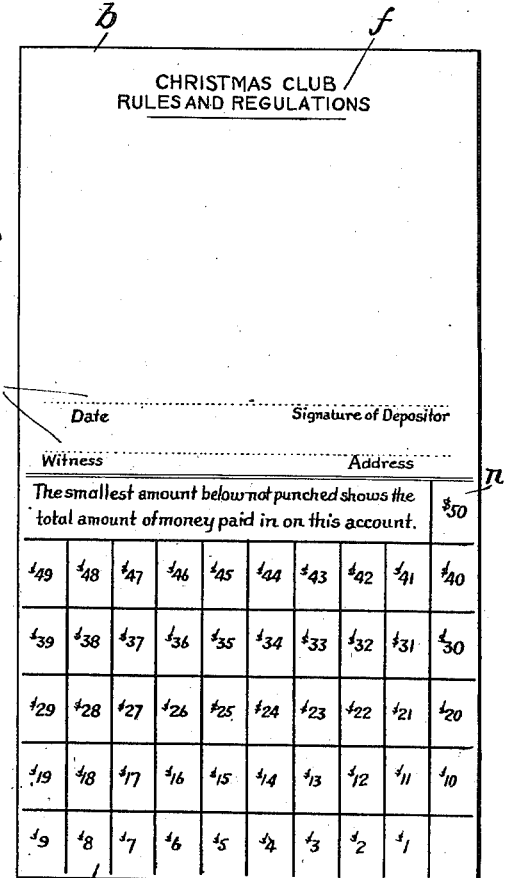
Figure 3:
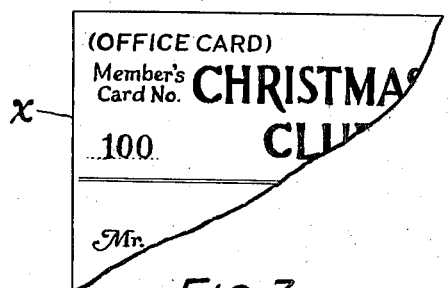

In the embodiment of my invention shown in the drawings: Figure 1 is a face view of one of the cards used by the depositor. Fig. 2 is a rear view of the same. Fig. 3 is a face view of one corner of the card used by the depository and which may otherwise be an exact duplicate of the depositor's card.

The face of the depositor's card is represented by $a$. The printed matter on the face of the card may vary as desired, but as illustrative merely of one convenient way of using the card I have illustrated, in abbreviated form, part of the printed matter appearing on cards in actual use. In this particular card, the depositor is supposed to make fifty weekly payments of one dollar each, commencing on a date closely following one Christmas and ending on a date closely preceding the following Christmas; the idea being to aid the depositor in saving money during the year so that he will be in possession, at the end of the year, of funds for meeting the expenses incident to the holiday season. The card is therefore appropriately entitled on the face "Christmas club" (see $c$ Fig. 1). Each account is given a number, which is placed (say) at $d$ at the upper left hand corner. A space $e$ is left for the entry of the name and address of the depositor, which, when filled in, shows that the depositor is entitled to deposit in the club, subject to the "rules and regulations" printed on the back $b$ (see $b$ Fig. 2), the amounts specified on the lower part of the face of the card. A space $g$ is left for the signature of the treasurer.

The lower part of the card is divided by intersecting lines into squares $h$ corresponding in number to the number of payments to be made. In the several squares are entered the dates when payments are due and preferably also the amounts to be paid. Directions are also given, as at $i$, to punch the card on the face side.

When a depositor makes a payment the card is punched at the point $j$ indicated by a cross or other conspicuous mark.

On the back of the card, beneath the rules and regulations, spaces $k$ are left for the signature and address of the depositor, for the date, and for the signature of a witness. The lower part of the back of the card is divided into squares $m$ corresponding in number and location to the squares $h$ on the front of the card. An additional square $n$ is also provided. In each back square (except at one corner) is printed a character expressing a certain amount. The characters expressing these amounts should be printed directly opposite the punch marks on the corresponding squares on the face of the card; so that when the card is punched on any square, the corresponding character is obliterated. Above the squares on the back is printed: "The smallest amount below not punched shows the total amount of money paid on this account."

It must be borne in mind that the left hand squares on the face of the card, as shown in Fig. 1, correspond to the right hand squares on the back of the card, as shown in Fig. 2. It will therefore be understood that the square at the lower left hand corner of Fig. 1 corresponds to the square at the lower right hand corner of Fig. 2. These two squares I will designate respectively the first front square and the first back square. It will be noticed that the first front square contains the data "Dec. 30, 1912, $1.00 due." This represents the amount of the first payment and the date when it becomes due. The first back square is blank. The second front square contains the date "January 6, 1913, $1.00 due." The second back square contains the data "$1." The third front square contains the data "Jany. 13, 1913, $1.00 due." The third back square contains the data "$2."

It will be observed that the character appearing on any given square on the back expresses an amount equal to the total sum of the amounts appearing on all the preceding front squares. Thus, assume that the depositor makes his first payment of one dollar. The first square is punched from the front. The smallest amount appearing on any of the back squares is "$1", on the second back square, and this represents the total amount paid. When the depositor makes his second payment, the second square is punched from the front. This eliminates the mark "$1" on the second back square, and the smallest amount appearing on any of the back squares is "$2" and this represents the total amount paid. When the depositor makes his third payment, the third square is punched from the front. This eliminates the mark "$2" on the third back square, and the smallest amount appearing on any of the back squares is "$3", which represents the total amount paid. When the depositor has made his final payment, all the marks on the back are eliminated except the amount "$50" on the extra square, and this represents the total amount paid. It may also be noted that each perforation made by the punch constitutes a receipt for the amount in the corresponding square.

The cards are adapted for use whether the amounts paid are uniform, or whether, as in some savings clubs, the amounts to be paid increase in an arithmetical ratio, throughout the term, or vary in some other way. It is only necessary that the amount printed on any given square on the back shall be the total sum of the amounts appearing in all the preceding front squares.

The depositor and the bank, club or other institution receiving and holding the deposits should each be provided with a card, which cards should be duplicates so far as concerns that part thereof which is divided into squares. They may be duplicates throughout and distinguished one from the other by color, although I prefer to also distinguish the card held by the depository by the words "Office card", or some similar designation, as shown in Fig. 3, in which x represents the card retained by the depositary. When a depositor makes a payment, the two cards are placed one over the other with faces up and punched through both. Thus each party retains a card.

Heretofore it has been found impracticable for banks, trust companies and savings institutions to handle accounts comprising a multitude of small deposits, and savings banks have uniformly refused to accept deposits below a minimum sum, by reason of the vast amount of work entailed in handling a large number of such accounts. In the ordinary savings bank the following method of keeping the depositor's accounts is in vogue. The depositor is furnished with a bound pass book having a number of pages for the entry of deposits. When a deposit is made the receiving teller enters the date of payment and the amount paid in the pass book and returns it to the depositor. The teller then enters upon a separate slip a record of the name of the depositor, the number of his pass-book, the amount received and the date of deposit. From this slip (or deposit ticket) an entry of the same item is made in the daily scratcher (or journal). The bookkeeper then posts the same data into the ledger to the credit of the depositor. Assuming, now, that a depositor makes fifty weekly payments, it is necessary for the bank clerks to make each one of the above entries fifty times. In other words, two hundred written entries must be made of the fifty transactions. It will thus be seen that a bank handling ten thousand different accounts involving weekly payments would have to employ a force of clerks sufficiently large to make two million detailed entries in the course of the year. Besides this, it is necessary for the bank to total on the ledger the payments made, and to know, at all times, the total amount paid by each depositor. Further, even with this prodigious amount of work the depositor is not informed, at any given time, of the total amount of his deposits, and this is a difficult matter to figure out especially where the deposits made increase or decrease in arithmetical ratio. By utilizing my recording and computing card, all this labor is entirely done away with. The depostior's card renders a pass book unnecessary, because the punch receipts for the amount deposited. The bank's card does away with the teller's (ticket) record, the scratcher and the ledger. Each punch-mark, made simultaneously through the two cards, records the corresponding payment on both the depositor's card and the bank's card; and the latter, when filed away in conformity with any of the known card-index systems, performs the same function as the ordinary ledger. Thus, not only is the necessity for a multitude of separate entries entirely dispensed with, but after any given payment the total amount paid is automatically receipted for and computed and thus the making of a large number of laborious arithmetical calculations is also rendered entirely unnecessary. It will thus be seen that my invention operates as a book-keeping expedient and as such is entirely automatic save only for the punching operations.

The invention has a wide range of utility. Even in cases where the separate deposits are relatively large, and where it might be profitable for the bank to handle the account in the ordinary way, the incentive to regular weekly savings is much more imperative than where the deposits are made in pass books in the regular way. Indeed it has been found profitable, with the employment of my recording and computing card, to handle accounts the individual payments in which arithmetically increase throughout the year, from one or two cents up to one or two dollars or arithmetically decrease from one or two dollars to one or two cents—the handling of which has heretofore been unthinkable and which enables savings banks to open accounts with a vast number of people, including children, whose small savings could not heretofore have been possibly handled. In this way my invention is admirably adapted to encourage habits of thrift in the community.

One of the advantages of the card herein described and shown is that after each payment not only is the total amount paid automatically computed or posted, but the immediately preceding computation is simultaneously eliminated; and thus the operations of recording, computing and the elimination of the previous computation are effected at one and the same time, by a single punching operation, and this too, effected both on the depositor's card and the bank's card.

Having now fully described my invention, what I claim and desire to protect by Letters Patent is:

1. A card of the character described having opposite recording and computing faces, the recording face of the card having spaces containing a consecutively arranged series of numerals indicating respectively payments to be made, and the computing face of the card having spaces containing a consecutively arranged series of numerals and located respectively opposite all the spaces on the recording face except the first and having also an extra space opposite one of said spaces on the recording face, each of said numerals on the computing face representing the sum of the numerals in the spaces preceding the immediately opposite space on the recording face, said extra space containing a numeral representing the sum of all the numerals on the recording face.

2. A card of the character described having opposite recording and computing faces, the recording face of the card having a number of consecutive spaces containing numerals and indicating respectively payments to be made, and the computing face of the card having immediately opposite spaces and also an extra space, all the spaces on the computing face except the first containing numerals each of which represents the sum of the numerals in the spaces preceding the immediately opposite space on the recording face, whereby when spaces containing consecutive numerals on the recording face are consecutively punched, the lowest numeral in the unpunched spaces on the computing face will, as the result of any given punching operation, indicate the sum of the payments made while at the same time the numeral indicating the sum of the preceding payments will be obliterated.

3. A card of the character described having a number of consecutive spaces containing numerals and indicating payments to be made and a number of consecutive spaces containing an equal number of numerals each of which represent the sums of all the payments after each payment, all of the second set of spaces and numerals except the last of the series being arranged respectively opposite all of the first set of spaces and numerals except the first of the series, whereby the card may be punched to simultaneously record a payment made and compute the sum of the payments made and cancel the computed sum of the previous payments and whereby after all the payments made are so recorded by punching all the computations will be canceled except the sum of the total payments.

In testimony of which invention, I have hereunto set my hand, at Philadelphia, on this 29th day of July, 1912.

CHARLES M. WRIGHTSON.

Witnesses:
 M. M. HAMILTON,
 FRANK S. BUSSER.